March 2, 1937.    C. G. ANASTOR    2,072,194
METHOD OF FORMING CANALS IN GLASSWARE
Filed Oct. 31, 1934
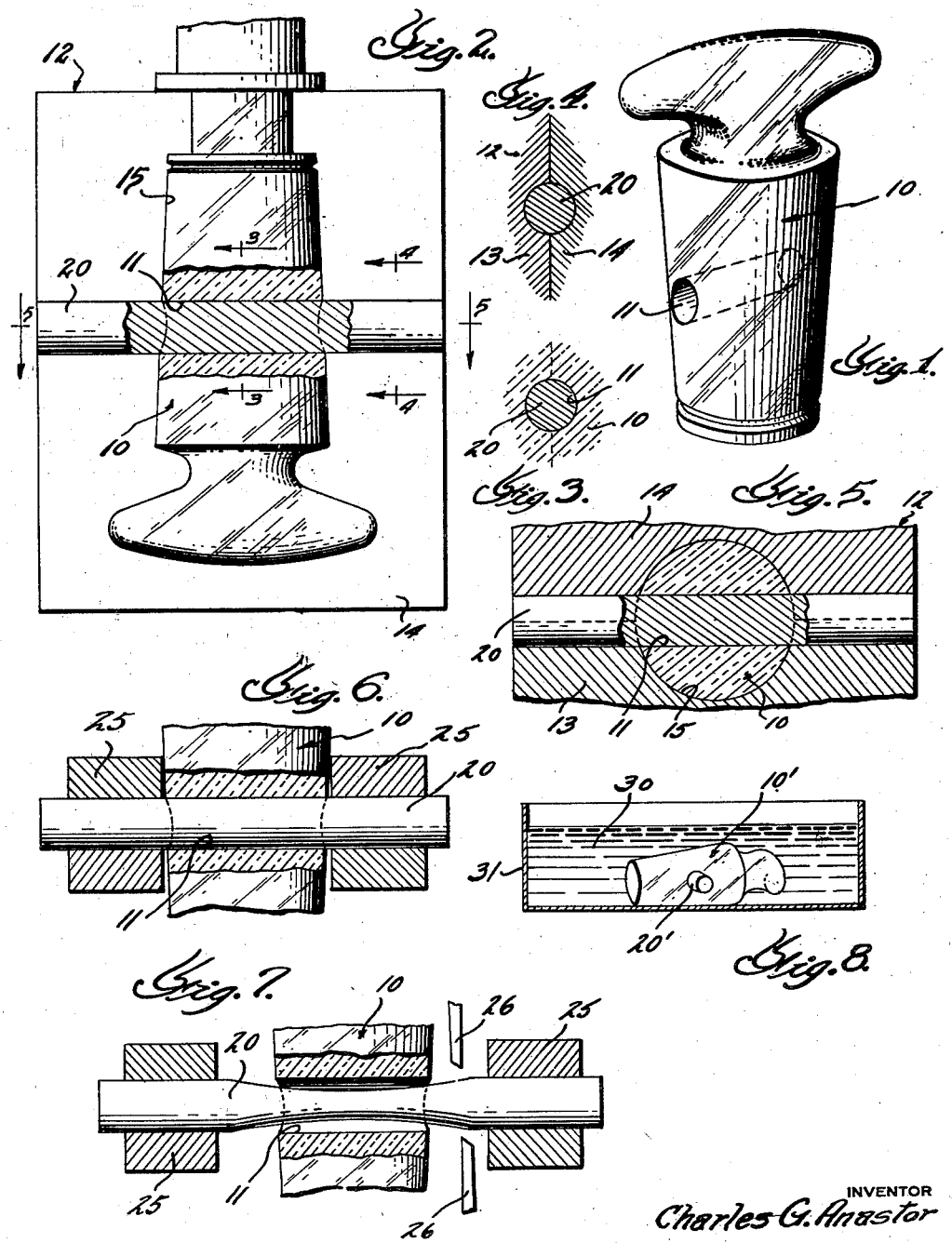
INVENTOR
Charles G. Anastor
BY
ATTORNEY Patented Mar. 2, 1937

2,072,194

UNITED STATES PATENT OFFICE 2,072,194

METHOD OF FORMING CANALS IN GLASSWARE

Charles G. Anastor, Vineland, N. J., assignor to Kimble Glass Company, Vineland, N. J., a corporation of Illinois Application October 31, 1934, Serial No. 750,752

4 Claims. (Cl. 49—77)

This invention relates generally to the forming of articles of glassware and has particular reference to a method for forming canals or holes through glass articles.

One of the primary objects of this invention is to provide a method of the above mentioned character by which canals or openings of any size or shape desired may be conveniently formed in glass articles.

A further object of this invention is to provide a method of the above mentioned character which may be employed in the forming of canals in either solid or hollow glass articles.

Numerous other objects and advantages of this invention will become more apparent as the following description proceeds particularly when reference is had to the accompanying drawing wherein two forms of the method are diagrammatically illustrated and wherein:

Fig. 1 is a perspective view of a glass article having a canal formed through the same by a method conforming to the teachings of this invention;

Fig. 2 is a semi-diagrammatic sectional view through a mold showing a glass article being formed in the same and showing one step in the method of forming a canal through the glass article;

Fig. 3 is a sectional view taken on the line 3—3 of Fig. 2;

Fig. 4 is a sectional view taken on the line 4—4 of Fig. 2;

Fig. 5 is a sectional view taken on the line 5—5 of Fig. 2;

Fig. 6 is a diagrammatic sectional view showing the glass article removed from the mold and illustrating a further step in the method of forming the canal;

Fig. 7 is a view similar to Fig. 6 showing a still further step in the method; and Fig. 8 is a diagrammatic sectional view showing a slightly modified step which may be employed in the method.

Heretofore, in the forming of canals or holes through solid glass bodies, such, for example, as stop cock plugs, it has been the practice to first form the plug in a mold and to then form the canal by drilling through the solid glass body. Obviously, this method required considerable time and made it difficult to form canals of other than constant cross sectional area and of circular cross sectional shape.

In the forming of canals through hollow glass bodies, it has heretofore been the practice to first form the body and to then seal a piece of tubing into the extremities of the glass article, the tubing constituting a cross member. This method has had the disadvantage among others, that it was extremely difficult to properly seal the tubing in the extremities of the glass article.

The present invention contemplates the elimination of the disadvantages of the prior practices and the provision of a method which will be applicable to either solid or hollow glass bodies and the provision of a method which may be economically carried out on a commercial scale.

In its broader aspects, the method consists in first placing in a mold or like cavity in which the glass body is to be formed, a core of the size and shape of the canal desired. The glass is then poured into the cavity and the article pressed or blown as the case may require. After the glass body has been formed in the cavity, the core is then wholly or partially destroyed so that the same will drop or may be readily removed from the glass body, leaving the canal or opening through the body. Obviously, the canal may be of any desired size and shape, and if desired, it may have a cross sectional shape other than circular.

More specifically, the method may consist in the following steps. A piece of soft metal rod or tubing of requisite ductility or malleability is inserted in the mold previous to the pouring of the glass into the mold. The rod or tube is of sufficient length to project from without the mold cavity into or through the mold cavity. The glass is then poured into the cavity and the article is pressed or blown depending upon whether a solid or hollow article is to be formed. The metal rod or tube may or may not remain in the glass article during the subsequent annealing, if the article is submitted to an annealing or any form of slow cooling process.

The metal rod or tube is then gripped at the points where it projects out of the glass article and is stretched to diminish its cross sectional area. It is then cut at the diminuted section and the parts removed from the canal.

As an alternate step in the method, the extraction of the metal tube or rod may be effected by subjecting the glass article containing the tube or rod to an acid bath, the metal thus being attacked and reduced to a salt of the particular acid used, the canal being thus left free.

It will be apparent that the rod or tube may be formed of any metal or like substance having the desired ductility and a coefficient of expansion adapted to the glass. Thus, for example, the tube or rod, which for the sake of convenience will hereafter be referred to as the core, may be made of copper, iron or other metals. Further, it will be apparent that in the modified method, any acid or like substance may be used which will act on the metal but not on the glass. Thus, for example, hydrochloric, nitric, sulphuric or like acids either alone or combined might be utilized for destroying the core to remove the same from the glass body.

As brought out above, the method is applicable to the forming of canals in either solid or hollow glass bodies. For the sake of illustration however, the method has been disclosed in the drawing as being applied to the forming of a canal through a stop cock plug, although it is to be definitely understood that the disclosure in the drawing is illustrative only and is in no way definitive of the limits of the inventive idea.

Still further, is should be noted that while in the drawing the canal is shown as being substantially circular in cross section, the canal may have any desired cross sectional shape, such as square, triangular or the like.

Referring then particularly to the drawing wherein like reference characters designate corresponding parts throughout all views, the numeral 10 designates generally a stop cock plug and the numeral 11 designates a canal or hole formed through this plug. In accordance with the usual practice, the stop cock plug is formed in a mold 12, the mold being formed of the separable half sections 13 and 14, these sections defining a mold cavity 15 of the size and shape desired in the finished plug.

In practicing the method, a core 20 is first placed in the mold, this core being either a metal rod as shown or a tube. The core is shown as being of such a length that it extends entirely across the mold cavity so that it will project from opposite sides of the stop cock plug when the latter is formed. The core is made of metal of sufficient ductility that the core may be easily stretched to reduce the cross sectional area of the same as will hereinafter be more fully described.

After the core has been inserted in the mold, the glass is poured into the mold and then pressed in accordance with the usual practice, to form the plug 10. The plug is then preferably removed from the mold by separating the half sections of the mold, and the plug either annealed or not, as desired.

To remove the core, the projecting ends thereof are gripped by suitable members 25 shown in Figs. 6 and 7, and the core is then stretched to reduce the cross sectional area of the same. As diagrammatically illustrated in Fig. 7, the reduced portion of the core may then be cut by suitable cutting members or shears 26 so that the sections thereof may fall easily from the glass article, leaving the canal free, as illustrated in Fig. 1 of the drawing. Obviously, if desired, the core prior to its insertion in the mold might be made with reduced ends. Then when the core is stretched as illustrated in Fig. 7 of the drawing, the ends will be able to pass through the canal with the result that it will not be necessary to cut the core.

As brought out before, an alternate method consists in subjecting the glass article containing the tube or rod to and acid bath, the metal thus being attacked and reduced to a salt of the particular acid used, leaving the canal free. This modified step which may be utilized is diagrammatically illustrated in Fig. 8 wherein the reference character 10' designates the stop cock plug with the core 20' in the same. The stop cock plug is shown as immersed in a bath 30 of acid which is contained in a suitable receptacle 31. It will be obvious that after the acid has partly eaten away the core, the core will be reduced to such an extent that it may fall readily from the glass article.

From the above it will be apparent that the invention provides a method by which openings of any desired size and shape may be formed through glass articles. The canals may be of constant cross sectional area throughout their length or they may if desired, have enlargements intermediate their ends as will be apparent. They may be either cylindrical in cross-sectional shape as indicated in the drawing, or they may be of any desired cross sectional shape which was not possible with the old method of drilling the openings.

In both of the methods which have been described, it will be apparent that in order to remove the core from the glass body, the cross sectional area of the core is reduced so that it does not firmly engage the walls of the canal in which it was contained with the result that it may be readily removed from the canal. This reduction in the cross sectional area of the core is effected by partially destroying the core, or stated differently, by permanently distorting the core. Thus, when the core is stretched and then cut as in the first described method, its original form is destroyed and it is permanently distorted. In the second described method, it will be apparent that if the glass body with the core therein is allowed to remain in the acid bath for a long period of time, the core will be wholly destroyed. If, on the other hand, the glass body with the core therein is subjected to the acid bath for only a short period of time, the core will be only partially destroyed or permanently distorted to a member of less cross sectional area whereby it may be readily removed from the canal in which it was contained.

While the method has been described as being incorporated in the forming of a canal through a solid glass article, namely, a stop cock plug, it is to be understood that the method will be equally applicable to the forming of canals through any glass articles whether these articles be solid as illustrated, or hollow. Thus, while the invention has been described with some detail, it is to be understood that the description is for the purposes of illustration only and is not definitive of the limits of the inventive idea, the right being reserved to make such changes in the steps of the method as will fall within the purview of the attached claims.

What I claim as my invention is:

1. The method of forming a canal through a glass body which consists in forming the glass body with a core formed of extensible material extending through the same, stretching the core to reduce the cross sectional area thereof and removing the core from the body.

2. The method of forming a canal through a glass body which consists in molding the glass body about a core which extends entirely through the glass body and projects from opposite sides thereof, the core being formed of a ductile material, pulling the projecting ends of the core away from each other to stretch the core to reduce the cross sectional area thereof, cutting the core into sections through the reduced portion thereof and removing the sections of the core from the canal.

3. The method of forming an opening in a glass body which consists in forming the body with a core projecting from the same, the core being formed of a material capable of being easily stretched, stretching the core to reduce the cross sectional area thereof, and removing the core from the body.

4. The method of forming an opening in a body which consists in positioning a core in the body at the location where it is desired to form the opening, the core being formed of a material capable of being easily stretched, stretching the core to reduce the cross sectional area thereof, and removing the core from the body.

CHARLES G. ANASTOR.